Aug. 17, 1954
J. W. FAY ET AL
2,686,543
CONVEYER SYSTEM
Filed May 27, 1952
3 Sheets-Sheet 1
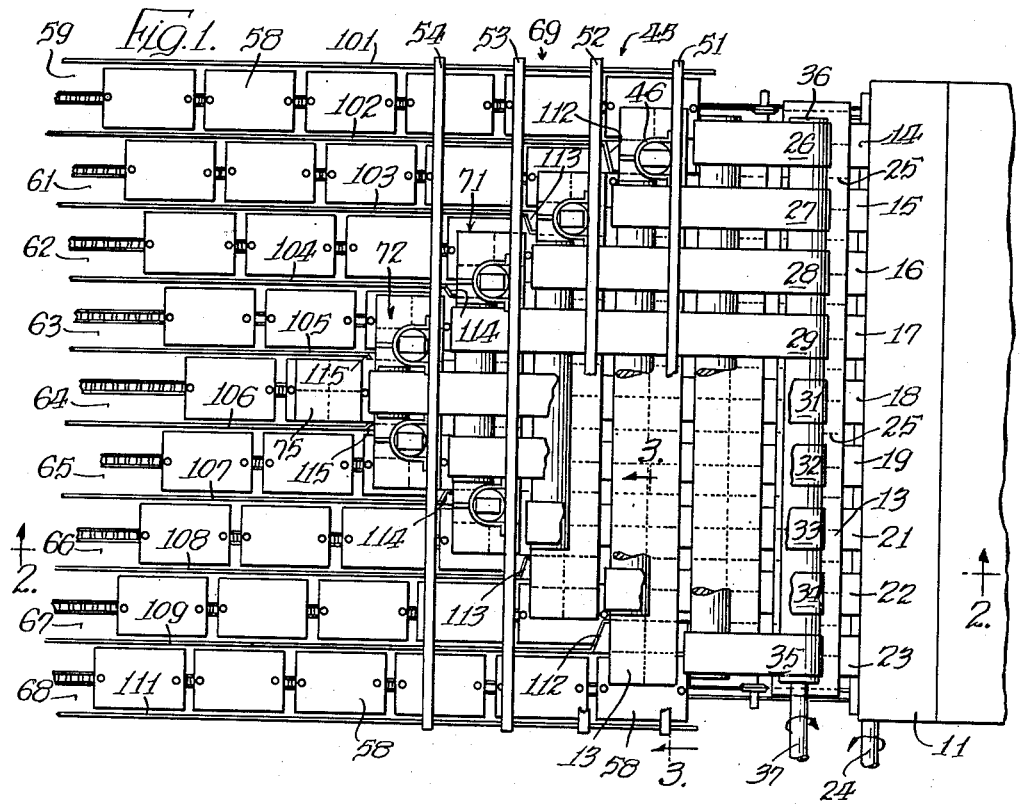
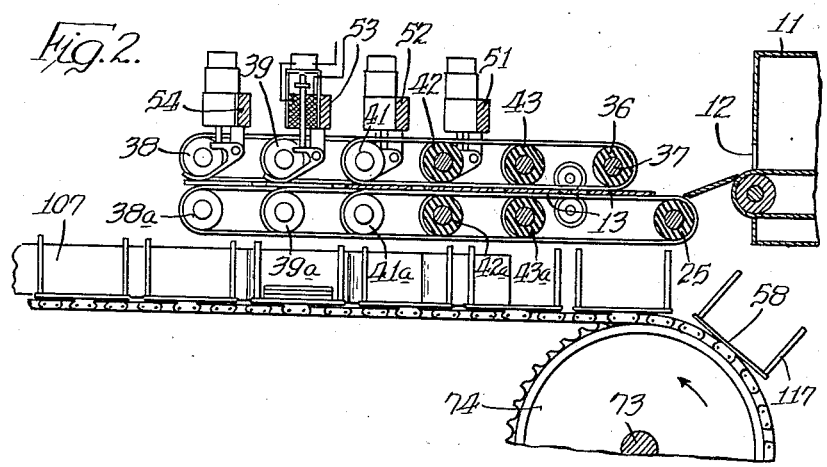
INVENTORS.
Joseph W. Fay
BY Rudolph J. Fay
Kegan and Kipnis
Attys.

Aug. 17, 1954  J. W. FAY ET AL  2,686,543
CONVEYER SYSTEM
Filed May 27, 1952  3 Sheets-Sheet 2
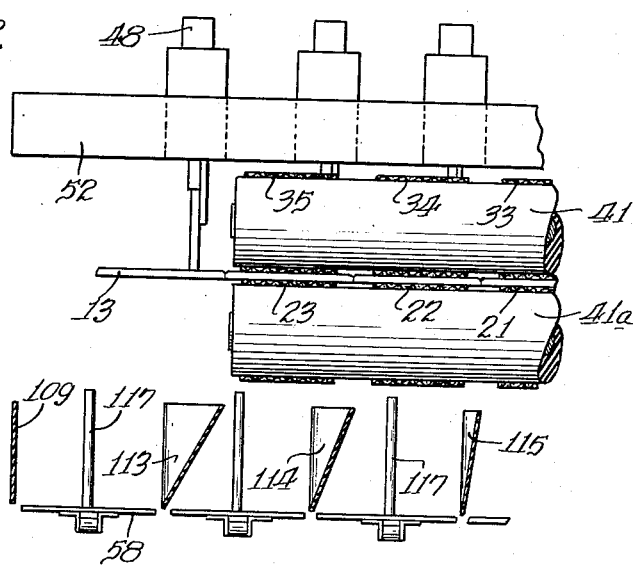
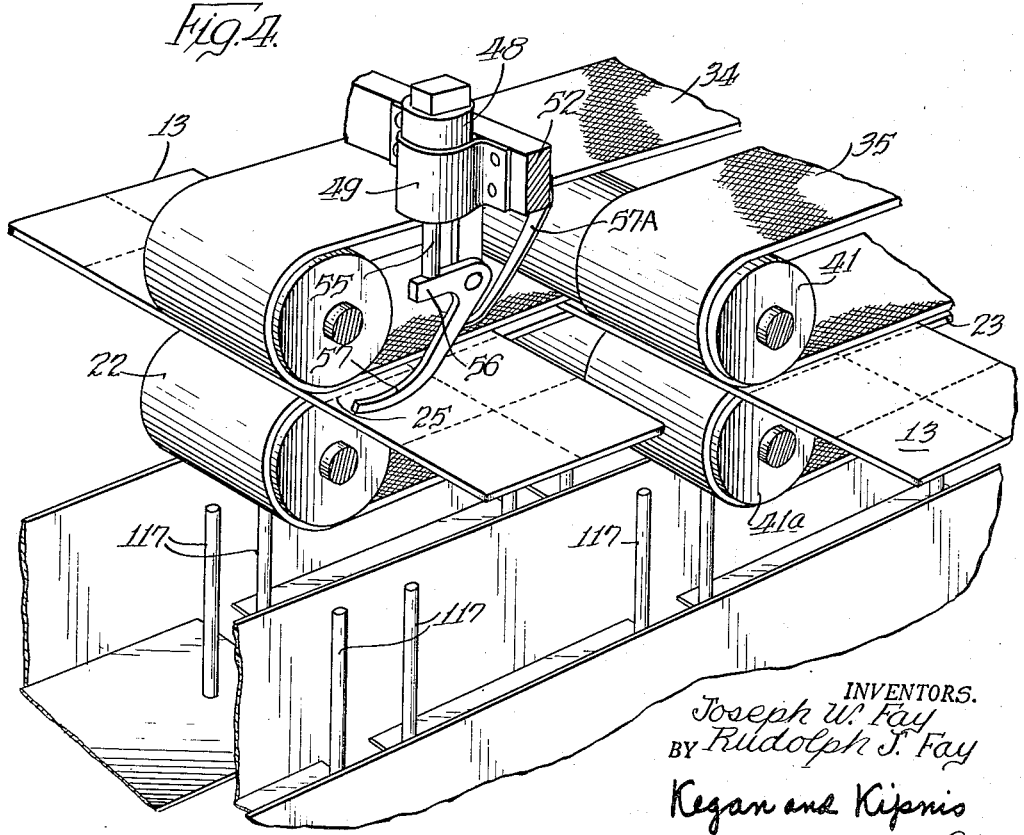
INVENTORS.
Joseph W. Fay
BY Rudolph J. Fay
Kegan and Kipnis
Attys.

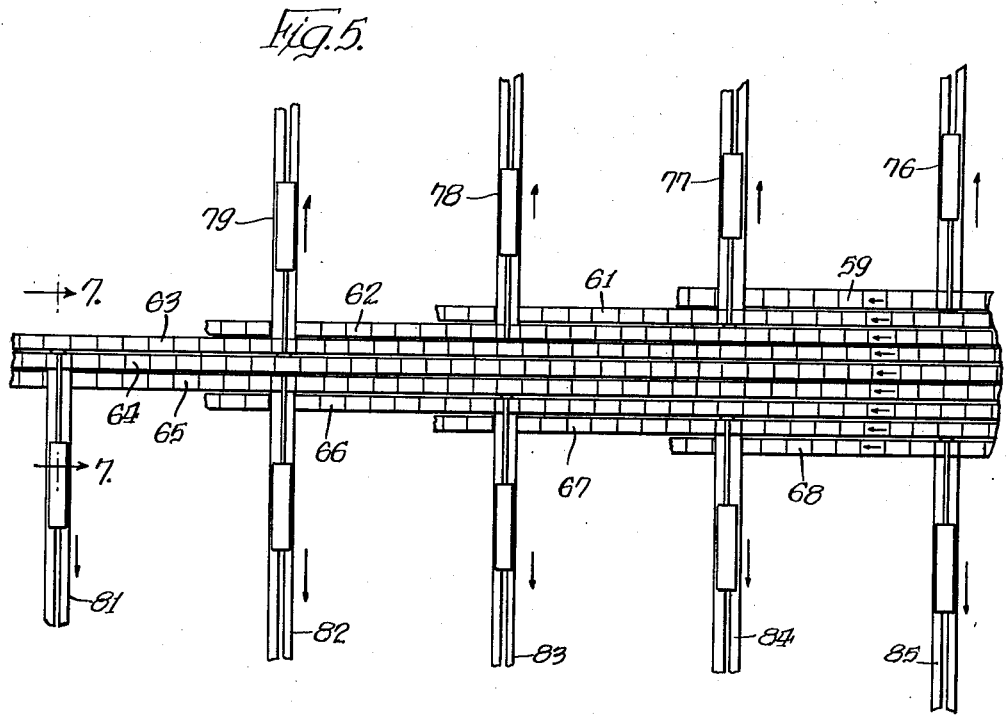
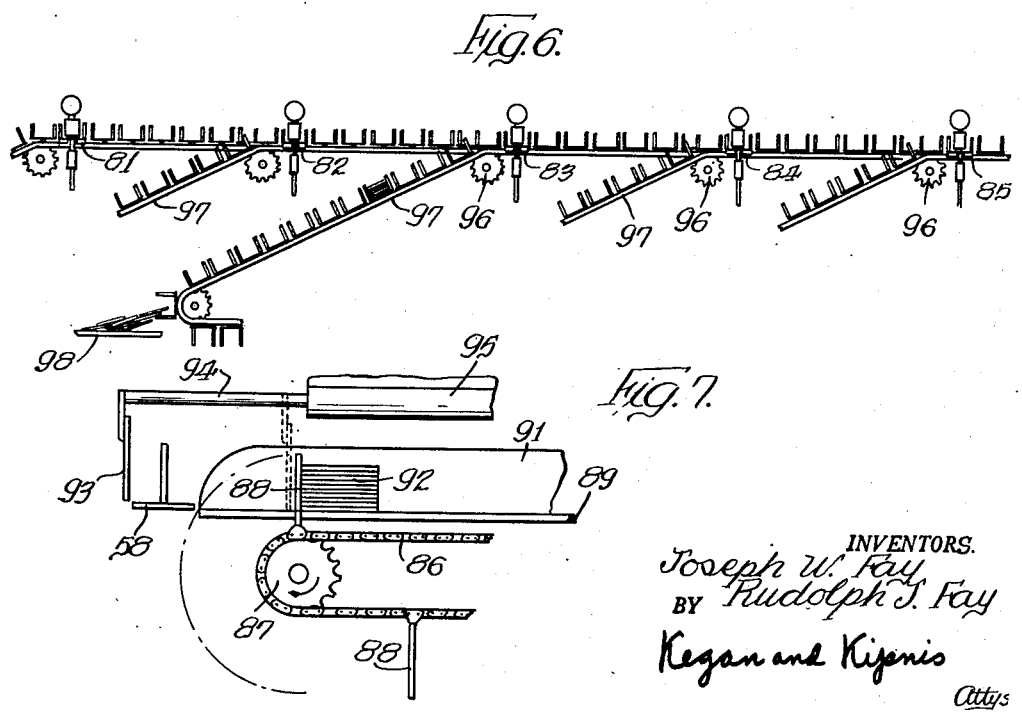

Patented Aug. 17, 1954

2,686,543

UNITED STATES PATENT OFFICE 2,686,543

CONVEYER SYSTEM

Joseph W. Fay and Rudolph Fay, Villa Park, Ill., assignors to Schulze and Burch Biscuit Company, Chicago, Ill., a corporation of Illinois Application May 27, 1952, Serial No. 290,304

13 Claims. (Cl. 146—129)

The present invention relates to an automatic conveyor system for articles such as soda crackers and cookies which have been baked in a continuous line baking oven and which have to be packaged by a continuous wrapping machine.

The invention relates to bakery goods produced in the baking oven and issuing therefrom in strip form. The strip, with the aid of primary and secondary conveyors, is broken into component panel units and these units, with the aid of secondary and tertiary conveyors, are collected and arranged in regular stacks which are delivered to the wrapping machines.

The principal object of the invention is to provide a self contained and full automatic system for all operations required between the baking oven and the wrapping machines; the transfer of the goods, their transformation from strip form to panel form, and their ultimate arrangement in stacks ready for wrapping.

Another important object is to provide such a system wherein the goods reach their ultimate arrangement within a minimum of travel time whereby they are protected from spoilage.

A particular object is to provide such a system which keeps the total travel time of all goods fairly short even in the event that one or some of the numerous wrapping machines required for the simultaneous wrapping of the different stacks of crackers are temporarily inactive due to exhaustion of wrapping material or the like.

Still another object is to transfer, transform and arrange the goods by positive but gentle operations, protecting them from irregular breakage and other injury.

For these purposes three conveyor systems are provided. The first or primary conveyor system comprises a plurality of parallel flat endless belts continuously moving from a receiving station, where all of said belts are in transverse alignment, to a system of staggered breaker and discharging stations. As strips of soda crackers emerge from the baking oven they enter, broad side ahead, upon the primary conveyor system and are carried forward to the discharge stations. Adjacent these latter stations the outermost ends of the cracker strips lose their support, the outer conveyor belt being relatively short. These ends are broken off and transferred to a lower level.

Here they are collected in stacks on carriages forming part of a secondary conveyor system. The secondary conveyors move intermittently only. During the intervals their carriages are at rest until they accumulate a predetermined quantity of crackers in form of a stack. In order to allow the formation and handling of orderly arranged stacks, at short distances from one another, the secondary conveyors are generally parallel with the superposed primary ones but are transversely spaced from one another at slightly greater distances than are the primary conveyors. Accordingly the transfer of panels from the primary to the secondary conveyors is best effected by a combination of falling and sliding movements and with the aid of special partitions to enforce such movements.

A tertiary conveyor and wrapping machine receives successive stacks of crackers from each secondary conveyor. In order to avoid mutual interference between the different wrapping machines, or interference between any one of them and the preceding conveyors, for instance when periodic reloading with wrapping material becomes necessary, the secondary conveyors are adapted, alternatively, to deliver stacks of crackers to intermediate recycling platforms, disposed at a lowermost level and not interfering with the other parts described.

By means of these arrangements the entire system can be made very simple, economical and efficient. For instance all primary conveyors can move together, and likewise all secondary conveyors can move together. Thus the control for the required intermittent starting and stopping of the secondary conveyors can be made very safe and simple.

In order that the invention may be more fully understood reference is made to the accompanying drawings which illustrate diagrammatically the construction and arrangement of a conveyor system involving the foregoing principles and objects. For the purposes of clarity in exposition the following description and the accompanying drawings are specific and show and describe one particular form of apparatus; but it should be understood that the invention is not restricted to the particular details shown and described but is measured by the claims appended hereto.

In the drawing:

Figure 1 is a plan view with portions broken away, diagrammatically illustrating the primary conveyor system and part of the secondary conveyor system, forming part of the present invention.

Figure 2 is a transverse sectional view taken on line 2—2 of Figure 1.

Figure 3 is an enlarged fragmentary sectional view taken approximately on line 3—3 of Figure 1.

Figure 4 is an enlarged perspective view of a discharge station at one end of a primary conveyor.

Figure 5 is a fragmentary plan view on a reduced scale diagrammatically illustrating the remainder of the secondary conveyor system and the tertiary conveyor system.

Figure 6 is a fragmentary side elevational view of the apparatus illustrated in Figure 5; and Figure 7 is a fragmentary enlarged sectional view taken on line 7—7 of Figure 5 to show a stack removing apparatus between the secondary and tertiary conveyor systems.

The baking oven 11 has a discharge opening 12 which continuously discharges a series of spaced, parallel strips 13 of baked cracker dough having uniform widths and lengths and moving broadside ahead, that is transversely of their length. These strips are almost as long as the discharge opening is wide. They drop from said opening onto the receiving end of a series of flat conveyor belts 14–23, which series is substantially as wide as is the discharge opening 12. These belts lie in a common plane and are jointly as wide as the strips are long. Thus the belts provide bottom support for the strips 13 and a means for removing them from the oven, to the left as shown. The belts are driven by a common drive shaft 24 which carries a wide pulley roll 25 around which all of the belts are trained. The travel of the belts is at least somewhat faster than that of the strips 13 as delivered by the oven 11.

Each baked strip 13 is divided into a certain number of cracker panels or subdivisions, for instance nine, by means of indentations or perforations P which are formed in the strips 13 by suitable apparatus not shown; preferably when the dough of the strips is still raw. Usually each panel or subdivision formed and defined by the indentation lines P is substantially square or rectangular. The number of conveyor belts 14 to 23, provided in this machine, equals the number of panels into which every successive strip 13 is divided; and one belt is provided for and substantially centered with each panel or square. The belts are disposed closely adjacent one another; in other words they are almost as wide as the individual panels are long. Each indentation line P comes to lie in the center of the space between two belts.

Immediately above the system of support belts 14 to 23 there is a similar but slightly shorter arrangement of conveyor belts 26 to 35, driven in unison by a common shaft 37 which carries a receiving and pulley roll 36. As may be observed from Figure 2 the upper belts 26 to 35 have their receiving end between the two ends of the supporting conveyor belts 14 to 23, thereby facilitating the transfer of strips 13 from the oven onto the primary conveyor system. The belts of the two superposed systems are arranged in parallel with one another and have directly superposed discharge ends. They are spaced apart by a sufficient vertical distance to enable them to receive between them the flat strips 13 and to gently retain these strips in the same spaced manner in which they are furnished by the oven, so that true and sustained parallel alignment is assured even against influences such as conveyor vibration and shifting tendencies due to the required breaking off of their cracker panels.

The two described systems of conveyor belts will be identified as the upper and lower components of the primary conveyor system. Except for the offset relationship of their receiving ends they are substantially in conformity with one another. Both components have an idler pulley roller at the discharge end of each belt, these rollers being designated 38 to 43 for the upper system and 38A to 43A for the lower system.

Each roller of course is held by suitable bearings not shown.

In order to facilitate the gradual breaking off of cracker panels the conveyor belts of each component, beginning with the center belt 31 of the upper system and the center belt 18 of the lower system and ranging sideward in both directions therefrom, are progressively shorter; and the distance by which each longer belt couple, for instance the couple 31 and 18, exceeds the adjacent shorter belt couples, for instance 29–32 and 17–19, equals the width of the strips 13 plus the distance between successive strips 13.

As a complete strip 13 of soda crackers reaches the first breaker position, designated 45 in Figure 1, its extreme or outermost cracker panels ride clear of support, from between the outermost conveyor belts 14 and 26 on the one hand and 23 and 35 on the other. Thus the outermost panels are now in position for becoming severed from the strip 13. This is accomplished by a corresponding pair of breakers 46.

Each breaker comprises an operating piston 47 contained within a housing 48 which is held by a clamping strap 49 to a support bar 51, 52, 53 or 54 extending transversely of the system of conveyors. Optionally these operating devices 47 may be pneumatic or hydraulic pistons or electric solenoid plungers. Upon actuation by whatever manner of apparatus that happens to be employed a downward projecting plunger 55 is caused to thrust against one arm 56 of a bell crank lever whose other arm 57 thereupon strikes against an unsupported cracker panel at a position close to the indented or perforated sever line P with a sufficient impact to break the panel sharply on said sever line. The panel then falls into a lower, waiting carriage 58 of the secondary conveyor belt line. A system 59 to 68 of such secondary lines is provided below and parallel with the primary system.

Spring return means 57A are provided to return each bell crank member 56, 57 and plunger 55 to the normal withdrawn position thereof as shown in Figure 4.

It will be noted that staggered discharge stations 45, 69, 71 and 72 are used, at the staggered discharge ends of the primary conveyor system as described. At each discharge station two end panels are broken off from strip 13, until only a center panel remains, lying on the center conveyor. It will further be understood that the operations of such discharge stations may be simultaneous; that is, while two relatively inner panels are broken off at station 69, two outermost panels are broken off from the next successive strip 13 at the discharge station 45. In this manner the cracker panels are transferred to the secondary conveyor system without delay and spoilage.

A suitable timing arrangement synchronized with the travel of the strips 13 is used for the purpose of effecting timely actuation of the different breakers as well as timely actuation of the secondary conveyor system. For instance one of the bell crank arms 57 may serve additionally as a feeler, not only as a percussive tool, and may actuate a switch 57B, as the arm is slightly raised upon the arrival of the strip 13. By well known timing and relay means not shown, operations of the switch 57 cause the ensuing operations of the different breaker mechanisms 57, and when such breaker operations have been repeated a predetermined number of times, a well known counter mechanism, not shown, can actuate the secondary conveyor shaft 73 and thereby the sprocket wheel 74 to perform a measured rotary movement of said sprocket wheel. This results in the advancement of all secondary conveyor chains 59 to 68 through a predetermined distance of travel, corresponding to the lengths of consecutive carriages 58 which in turn is just slightly greater than the width of a cracker panel. In this manner succeeding series of carriages are placed in the several collector stations 45, 69, 71 and 72 and the secondary conveyor system is loaded with closely spaced stacks of cracker panels.

A foremost and central collector station designated 75 is provided for receiving the central cracker panel of each strip 13, which panel obviously requires no breaker for its release.

It will be observed from Figures 2, 5 and 6 that the secondary conveyors 59 to 68 are moved in a leftward direction by their sprocket wheels 74. They extend from under the primary conveyors, to locations considerably beyond the discharge points 45, etc. Eventually each secondary conveyor comes into range of a tertiary conveyor, a group of the latter being identified in Figure 5 by the reference numerals 76 to 85. A prominent feature of the tertiary conveyors, distinguishing them from the primary and secondary ones, is their spread out and independent relationship from one another and their general perpendicularity to the principal direction of the other two systems.

As shown in Figure 7 each of the tertiary conveyors consists in an individual conveyor chain 86 traveling over feed and idler sprockets 87 and carrying a number of propelling or pusher fingers 88 suitably spaced apart. These fingers are designed to move stacks of cracker panels upon a tertiary conveyor track 89, between side walls 91. Each cracker stack 92 is transferred laterally from its secondary conveyor carriage 58, during rest intervals of the latter. Such transfer is effected by a shiftable paddle 93 adjacent the intersection between the secondary and tertiary conveyors, which paddle is capable of moving from a normal position shown in full outline to a displaced position shown in dotted outline in Figure 7. Each paddle shifts successive stacks of crackers to the tertiary track 89 whereon the tertiary conveyor fingers 88 propel the stack to a wrapping machine, not shown, which machine is disclosed in the co-pending application Serial No. 267,543 filed January 22, 1952 and now Patent No. 2,661,103, by the present co-inventors and in the co-pending application Serial No. 144,809 filed on February 17, 1950, by the present co-inventor, Joseph W. Fay.

Each paddle 93 is carried upon a rod 94 which is normally held in its extended position but is capable of being shifted in a direction toward the right as shown in Figure 7, upon the operation of a suitably actuated member 95. The operating devices 95 are preferably under the supervisory control of the individual wrapping machines, not shown, whereby they and the tertiary conveyors 76 to 85 are kept in timed relation with the operations of the secondary conveyor chains.

In the event that any one or more of the wrapping machines becomes momentarily inactive for instance by a depletion of wrapping paper or cellophane or other material or for other causes, the impulse control causing the shifting of the related paddle 93 can on that account be omitted by well known means not shown. As a result the related secondary conveyors 59 and 68, upon reaching the transfer station or location of encounter with the related tertiary conveyor, will fail to discharge its load or stack of cracker panels and instead will carry such load or loads beyond the transfer point and over its intermediary sprocket wheel 96 where the upper run of the secondary conveyor chain turns from its original flat or horizontal position into a descending flight portion 97 as best shown in Figure 6. This provision results in the ultimate discharge of those particular loaded carriages 58 onto a collection platform 98 at the bottom end of the respective secondary conveyor, from which said carriages can be manually recycled for distribution among the different secondary conveyors, pursuant to and in accordance with the progress of work on the different wrapping machines.

It will be noted that the aforedescribed arrangement of secondary and tertiary conveyors provides full transverse accessibility thereto for the supply of the wrapping machines and that it safeguards the entire system against shutdown in the event that one or more of the tertiary conveyors and their related wrapping machines become temporarily disabled.

Attention is also directed to the manner of coordinating the parallel primary and secondary conveyor systems and transferring the cargo from the first to the second; the second being of necessity somewhat wider than the first. It may be observed from Figure 1 that the primary conveyor system has an overall width corresponding to the length of the cracker strips 13. The secondary conveyor system, which receives the component panels of these cracker strips in severed condition, is appreciably wider, to afford clearance between its moving component conveyors and thus to prevent interference between their carried cargoes.

The central conveyor belts 13 and 18 of the primary system are in vertical alignment with the central conveyor 64 of the secondary system. In the case of the next adjacent primary system conveyor belts 29 and 17, there will be noted an offset relative to the corresponding secondary conveyor 63; and the primary conveyor belts 32 and 19 are correspondingly offset toward the other side from the secondary conveyor 62. These displacements are cumulative in succeding conveyor units of the secondary system.

In order to prevent any misalignment of cracker stacks, as a result of this cumulative displacement of secondary conveyors relative to the primary conveyors, there is provided, between corresponding pairs of primary and secondary conveyors, a system of guiding and partition walls 101 to 111, see Figures 1 and 3. These walls are formed of thin sheet partitioning material disposed vertically or nearly vertically in the forward regions of the secondary conveyor system but inclined as at 112 to 115 in the region immediately beneath the primary conveyor system. Thus the severed cracker panels will fall and slide onto the carriages 58 along the inclined portions of the partition walls and will subsequently be guided into vertically stacked condition, as the carriages 58 progress into and through the spaces between the vertical portions of the partition walls. The different stacks are also confined in the properly arranged positions, intermediate upstanding stake pins 117 which may be integral with the floor of each carriage 58 and which prevent longitudinal shifting of the stacks.

While this invention has been explained with reference to particular illustrations it will be understood that numerous changes can be made without departing from the essential spirit and scope thereof. Accordingly it is not intended that this invention be limited except as indicated in the hereunto appended claims.

We claim:

1. In a conveyor system a first series of parallel conveyors closely spaced from one another to provide support for a long strip extending across the conveyors, the receiving ends of the conveyors being aligned with one another and their discharge ends being staggered to remove support progressively from end portions of the strip; power means for imparting movement continuously to said first series of conveyors; a second series of conveyors, each conveyor of the second series having a receiving end generally below the discharge end of conveyor of the first series; strip severing means adjacent said discharge ends; power means for imparting movement periodically to said second series of conveyors; and guide means at each of said discharge ends to guide severed portions of said strip from each conveyor of the first series to the underlying conveyor of the second series.

2. In a conveyor system a first series of substantially flat parallel closely spaced conveyors, the receiving ends of the conveyors of said series being transversely aligned and their discharge ends being staggered; power means for imparting movement to said first series of conveyors; a second series of substantially flat conveyors disposed parallel to said first series, with receiving ends below said discharge ends, said second-named conveyors being less closely spaced than the primary ones; power means for imparting movement to said second series of conveyors; and guide means including stationary and inclined guide walls at each of said discharge ends to guide cargo from each primary conveyor to the next underlying secondary conveyor.

3. A conveyor system as described in claim 2 wherein the first series of conveyors is adapted to receive at its receiving end a succession of strips of material, each strip extending across the first series of conveyors; the system comprising also breaker means at each of said discharge ends except a central one, to break off an outer part from such a strip for transfer to the second series of conveyors with the aid of said guide means.

4. A conveyor system according to claim 3 additionally comprising clamp means adjacent each discharge end to clamp the remaining part of said strip to those of the conveyor belts which have their discharge ends spaced further away from the receiving end.

5. A conveyor system according to claim 4 wherein the clamp means comprises conveyor belts parallel with those of the first series, directly superposed thereabove, the mutually superposed conveyor belts facing one another.

6. A conveyor system according to claim 5 wherein the upper conveyor belts have their receiving ends between the receiving and discharge ends of the first mentioned conveyor belts of the first series.

7. In a conveyor system a first series of parallel closely spaced conveyors, the receiving ends of said conveyors being aligned and their discharge ends being staggered; a second series of conveyors disposed generally parallel to said first series and with receiving ends at least approximately below said discharge ends of the first series, the conveyors of the second series comprising juxtaposed runs which are substantially flat over part of their length from their receiving ends and then sloping, the points of change from flat to sloping extension being staggered; power means for imparting continuous movement to said two series of conveyors; means to remove cargo from each conveyor of the second series adjacent the point of change from flat to sloping extension; and auxiliary means to remove cargo from each conveyor of the second series adjacent the end of the sloping extension.

8. A conveyor system as described in claim 7 wherein said juxtaposed runs are upper runs, their sloping parts slope downward from their flat parts, and said auxiliary means substantially consist in a platform at and below each end of a sloping extension.

9. In a conveyor system a first series of parallel, juxtaposed conveyors, the receiving ends of said conveyors being aligned with one another and their discharge ends being staggered; power means for imparting movement continuously to said first series of conveyors a second series of conveyors disposed parallel to said first series and with receiving ends below said discharge ends; power means for imparting intermittent movement to said second series of conveyors; means at each of said discharge ends for transferring cargo from a conveyor of said first series to a conveyor of said second series; a third series of conveyors disposed transversely of the second series with receiving ends intermediate the ends of the conveyors of the second series; means at each receiving end of a conveyor of the third series for transferring cargo from the second to the third; and power means for imparting continuous movement to said first and intermittent movement to said second and third series of conveyors.

10. A conveyor system as described in claim 9, additionally comprising means to feed elongated, severable strips of material onto the first series of conveyors in a direction transverse of the length of the strips and parallel with said conveyors; and means at said staggered discharge ends to sever said strips into panels and to transfer such panels to the second series of conveyors.

11. A conveyor system as described in claim 9, wherein all means to sever said strips are adapted to operate simultaneously, and said power means are adapted to start and stop said second and third series of conveyors in a timed relationship with said means to sever the strips.

12. In a conveyor system a series of conveyors disposed parallel with one another and having upper runs which are first substantially flat and then inclined, said inclined portions being staggered with respect to one another; power means for imparting periodic movement to said series of conveyors; means at one end of each conveyor for transferring cargo thereto; another series of conveyors disposed transversely of the first mentioned series, parallel with one another, intersecting the first mentioned series adjacent the turns from the substantially flat to the inclined portions; pusher means at each intersection of first mentioned and second mentioned conveyors to transfer cargo from the one to the other; means at the free end of each second mentioned conveyor to remove cargo therefrom and power means for imparting intermittent movement to the second-mentioned series of conveyors.

13. A conveyor system according to claim 12, wherein said pusher means are adapted to move across the conveyors of the first-mentioned series, and along the conveyors of the second-mentioned series, during rest periods between said periodic and intermittent movements.

References Cited in the file of this patent

UNITED STATES PATENTS

| Number | Name | Date |
|---|---|---|
| 1,445,797 | Pierce | Feb. 20, 1923 |
| 1,692,860 | Petri | Nov. 27, 1928 |
| 1,992,788 | Tewes | Feb. 26, 1935 |
| 2,144,720 | Gibson | Jan. 24, 1939 |
| 2,173,000 | Holtzman et al. | Sept. 12, 1939 |
| 2,179,672 | Roys | Nov. 14, 1939 |
| 2,379,117 | Touton | June 26, 1945 |

FOREIGN PATENTS

| Number | Country | Date |
|---|---|---|
| 729,825 | Germany | Dec. 25, 1942 |